US010540749B2

(12) United States Patent
Cansizoglu

(10) Patent No.: US 10,540,749 B2
(45) Date of Patent: Jan. 21, 2020

(54) SYSTEM AND METHOD FOR LEARNING-BASED IMAGE SUPER-RESOLUTION

(71) Applicant: Mitsubishi Electric Research Laboratories, Inc., Cambridge, MA (US)

(72) Inventor: Esra Cansizoglu, Malden, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 111 days.

(21) Appl. No.: 15/939,731

(22) Filed: Mar. 29, 2018

(65) Prior Publication Data

US 2019/0304063 A1 Oct. 3, 2019

(51) Int. Cl.
*G06T 3/40* (2006.01)
*G06K 9/62* (2006.01)
*G06K 9/46* (2006.01)

(52) U.S. Cl.
CPC .......... *G06T 3/4046* (2013.01); *G06K 9/4647* (2013.01); *G06K 9/6256* (2013.01); *G06T 3/4053* (2013.01)

(58) Field of Classification Search
CPC ... G06T 3/4046; G06T 3/4053; G06K 9/4647; G06K 9/6256
See application file for complete search history.

(56) References Cited

U.S. PATENT DOCUMENTS

| 8,538,202 B2* | 9/2013 | Maslov ................. G06T 3/4053 382/299 |
| 9,064,476 B2* | 6/2015 | Sun ........................ G09G 5/391 |
| 9,153,010 B2* | 10/2015 | Tezuka ............... H04N 1/40068 |
| 9,836,820 B2 | 12/2017 | Tuzel et al. |
| 2018/0374197 A1* | 12/2018 | Zhang ................... G06T 3/4053 |

FOREIGN PATENT DOCUMENTS

| CN | 101888557 A | 6/2010 |
| CN | 101888557 A | * 11/2010 |
| CN | 106204489 A | 7/2016 |

(Continued)

OTHER PUBLICATIONS

Yinggan Tang et al., Convolutional Neural Network with Gradient Information for Image Super-Resolution, Aug. 2016, Proceedings of the IEEE International Conference on Information and Automation, pp. 1714-1719. (Year: 2016).*

(Continued)

*Primary Examiner* — Brenda C Bernardi
(74) *Attorney, Agent, or Firm* — Gennadiy Vinokur; James McAleenan

(57) ABSTRACT

An image processing system includes an input interface to receive a set of pairs of images to train an image generator, each pair includes a low-resolution image of a scene and a high-resolution image of the scene, a processor to train the image generator by solving an optimization problem to produce parameters of the image generator reducing distances between image gradients of the high-resolution images and the corresponding low-resolution images upsampled by the image generator, and an output interface to render the parameters of the image generator.

15 Claims, 7 Drawing Sheets

(56) References Cited

FOREIGN PATENT DOCUMENTS

| | | | |
|---|---|---|---|
| CN | 107240066 A | | 4/2017 |
| CN | 106204489 B | * | 4/2019 |
| EP | 3246875 A2 | | 5/2017 |

OTHER PUBLICATIONS

Xing Yan et al., Fast Gradient-Aware Upsampling for Cartoon Video, Apr. 2010, International Conference on Image Analysis and Signal Processing, IEEE, 4 pgs. (Year: 2010).*

Jian Sun et al., Image super-resolution using gradient profile prior, Jun. 2008, IEEE Conference on Computer Vision and Pattern Recognition, 8 pgs. (Year: 2008).*

Willliam T. Freeman et al., Learning Low-Level Vision, Mitsubishi Electric Research Laboratories, Dec. 2000, pp. 1-43. (Year: 2000).*

Jingxu Chen et al., Single image super-resolution based on deep learning and gradient transformation, IEEE 13th International Conference on Signal Processing (ICSP), 5 pgs. (Year: 2016).*

W. T. Freeman et al., Example-based super-resolution, IEEE Computer Graphics and Applications, Mar./Apr. 2002, vol. 22, Issue 2, pp. 56-65. (Year: 2002).*

Raanan Fattal, Image Upsampling via Imposed Edge Statistics, Jul. 2007, ACM Transactions on Graphics, vol. 26, No. 3, Article 95, 8 pgs. (Year: 2007).*

Hu et al., "Revisiting Single Image Depth Estimation: Toward Higher Resolution Maps with Accurate Object Boundaries," ARXIV. org, Cornell University Library, Ithaca NY 14853. Mar. 23, 2018.

Curtis et al., "Optimization Methods for Supervised Machine Learning From Linear Models to Deep Learning," The Operations Research Revolution, Jun. 30, 2017, pp. 89-113. Retrieved from the internet: http://pubsonline.informs.org/doi/10.1287/educ.2017.0168, retrieved Jan. 17, 2019.

Tralie et al., "Edge, Corner, and Blob Detection," Feb. 16, 2018, pp. 1-3. Retrieved from the internet: https://web.archive.org/web/20180216205226/http://www.ctralie.com/Teaching/EdgeCornerBlob/, retrieved Jan. 17, 2019.

Ingle Image Super-Resolution Through Automated Texture Synthesis (a Non Patent Literature, Assignee: Max Planck Institute for Intelligent Systems, Publication Date: Jul. 30, 2017)CN107240066.

* cited by examiner

SYSTEM AND METHOD FOR LEARNING-BASED IMAGE SUPER-RESOLUTION

TECHNICAL FIELD

This invention relates generally to image processing and more particularly to image super-resolution to produce a high-resolution image from a low-resolution image.

BACKGROUND

Super-resolution is a task aiming to produce a high-resolution image from a low-resolution image. For example, face upsampling or a face super-resolution is the task of generating a high-resolution face image from a low-resolution input image of the face. The face upsampling has widespread application in surveillance, authentication and photography. Face upsampling is particularly challenging when the input face resolution is very low (e.g., 12×12 pixels), the magnification rate is high (e.g. 8×), and/or the face image is captured in an uncontrolled setting with pose and illumination variations.

There are mainly three categories for approaching the super-resolution, namely interpolation-based methods, reconstruction-based methods, and learning-based methods. Interpolation-based methods are simple but tend to blur the high frequency details. For example, the interpolation-based methods include nearest neighbor interpolation, bilinear interpolation and bicubic interpolation. However, the interpolation based image super-resolution produces smoothed images where details of the image are lost or have inadequate quality. To obtain sharp high-resolution images, some methods used image sharpening filters such as bilateral filtering after the interpolation.

Reconstruction-based methods enforce a reconstruction constraint, which requires that the smoothed and down-sampled version of the high-resolution image need to be close to the low-resolution image. For example, one method uses a two-step approach for hallucinating faces. First, a global face reconstruction is acquired using an eigenface model, which is a linear projection operation. In the second step details of the reconstructed global face is enhanced by non-parametric patch transfer from a training set where consistency across neighboring patches are enforced through a Markov random field. This method produces high-quality face hallucination results when the face images are near frontal, well aligned, and lighting conditions are controlled. However, when these assumptions are violated, the simple linear eigenface model fails to produce satisfactory global face reconstruction.

Learning-based methods "hallucinate" high frequency details from a training set of high-resolution/low-resolution image pairs. The learning-based approach relies to a significant extent on the similarity between the training set and the test set. However, it is challenging for the learning-based methods to reconstruct high-frequency details of the super-resolved image, see, e.g., U.S. Pat. No. 9,836,820. For example, one method uses a bi-channel convolutional neural network (BCCNN) for face upsampling. The method uses a convolutional neural network architecture that includes a convolution followed by fully connected layers, whose output is averaged with the bicubic upsampled image. The last layer of this network is fully connected where high-resolution basis images are averaged. Due to the averaging, person specific face details can be lost.

Accordingly, there is a need for a learning-based super-resolution method suitable for upsampling high-frequency details of an image.

SUMMARY

Machine learning is a field of computer science that gives computers the ability to learn a specific task without being explicitly programmed to accomplish that task. For example, the machine learning allows to represent a complex task as a learned parametric function, which reduces the memory usage required for accomplishing the task and streamlines the performance of the processor performing the task. Machine learning is used in variety of applications such as object recognition, verification & detection, image segmentation, speech processing and control.

Artificial neural networks (ANNs), such as convolutional Neural Networks (CNN), Recurrent Neural Networks (RNN) form a part of the machine learning framework inspired by the biological neural networks. Such neural network based systems learn to do tasks by considering examples, generally without task-specific programming Such a learning process is usually referred as training, i.e., training the neural network. For example, in image super-resolution, neural network based systems may learn to upsample images to reduce L2 distance, i.e., Euclidean distance, between image pixels of ground truth high-resolution image and images super-resolved by the neural network.

Before a neural network can accomplish the task, the neural network needs to be trained, which can be a tedious process. Some embodiments are based on recognition that neural network can be trained for image super-resolution to minimize L2, e.g., Euclidean, distance between image pixels of ground truth high-resolution image and super-resolved image as a cost function in the training stage. However, the use of L2 distance between pixel intensities can potentially smooths out important details in the super-resolved upsampled image, because an average image gives a low L2 distance with the ground truth. Accordingly, there is a need to preserve high frequency details of the upsampled image such as an image of a face.

In order to preserve high frequency details, some embodiments use L2 distance between image gradients of ground truth and super-resolved faces. The use of image gradient distance helps to speed up convergence as well as to produce sharper looking images. The image gradient distance can be used additionally or alternatively to the reconstruction loss based on pixel intensities.

Some embodiments are based on recognition that the upsampling of the photorealistic high-resolution image, e.g., the image of a face, need to satisfy the following constraints. The first constraint is a global constraint that mandates that the reconstructed high-resolution face image need to satisfy holistic constraints such as shape, pose, and symmetry, and need to include detailed characteristic facial features such as eyes and nose. The second constraint is a local constraint that mandates that the statistics of the reconstructed local image regions need to match that of high-resolution face image patches, e.g., smooth regions with sharp boundaries, and should include face-specific details. The third constraint is a data constraint that mandates that the reconstruction need to be consistent with the observed low-resolution image. However, although L2 distance between pixel intensities can preserve data constraints, it can fail to satisfy global and local constraints that are critical for further recognition of the image.

Some embodiments are based on realization that high frequency information in an image comes from the regions with large image gradients. Thus, if the large gradients are preserved during upsampling process, the resulting images can be sharper. Moreover, the shape statistics of the gradient profiles in a natural image are stable and invariant to the image resolution. With such stable statistics, the statistical relationship of the sharpness of the gradient profile between the high-resolution image and the super-resolved low-resolution image can be learned. Using the gradient profile prior and the statistical relationship, a constraint is provided on the gradient field of the high-resolution image. When combined with a reconstruction constraint, high-quality high-resolution image results.

Some embodiments are based on recognition that high magnification factors greater than four times for targeted objects such as faces can benefit from the deep learning methods to provide an upsampling of the image that is as close as possible to "a face image". Because, in some applications, resulting upsampled images are meant to be used in face identification task, recovering "the face" is beneficial. Some embodiments present an image super-resolution method that preserves high frequency details that are beneficial for further classification or recognition of the images.

To that end, in order to preserve high frequency details, some embodiments use L2 distance between image gradients of ground truth images of high resolution and the corresponding images super-resolved by the neural network to train the neural network for image super-resolution. The use of image gradient constraints helps to speed up convergence as well as to produce sharper looking images.

Accordingly, one embodiment discloses an image processing system, including an input interface to receive a set of pairs of images to train an image generator, each pair includes a low-resolution image of a scene and a high-resolution image of the scene; a processor to train the image generator by solving an optimization problem to produce parameters of the image generator reducing distances between image gradients of the high-resolution images and the corresponding low-resolution images upsampled by the image generator; and an output interface to render the parameters of the image generator.

Another embodiment discloses an image processing method, wherein the method uses a processor coupled with stored instructions implementing the method, wherein the instructions, when executed by the processor carry out steps of the method, including receiving a set of pairs of images to train an image generator, each pair includes a low-resolution image of a scene and a high-resolution image of the scene; training the image generator by solving an optimization problem to produce parameters of the image generator reducing distances between image gradients of the high-resolution images and the corresponding low-resolution images upsampled by the image generator; and outputting the parameters of the image generator.

Yet another embodiment discloses a non-transitory computer readable storage medium embodied thereon a program executable by a processor for performing a method, the method includes receiving a set of pairs of images to train an image generator, each pair includes a low-resolution image of a scene and a high-resolution image of the scene; training the image generator by solving an optimization problem to produce parameters of the image generator reducing distances between image gradients of the high-resolution images and the corresponding low-resolution images upsampled by the image generator; and outputting the parameters of the image generator.

DETAILED DESCRIPTION

Figure 1:
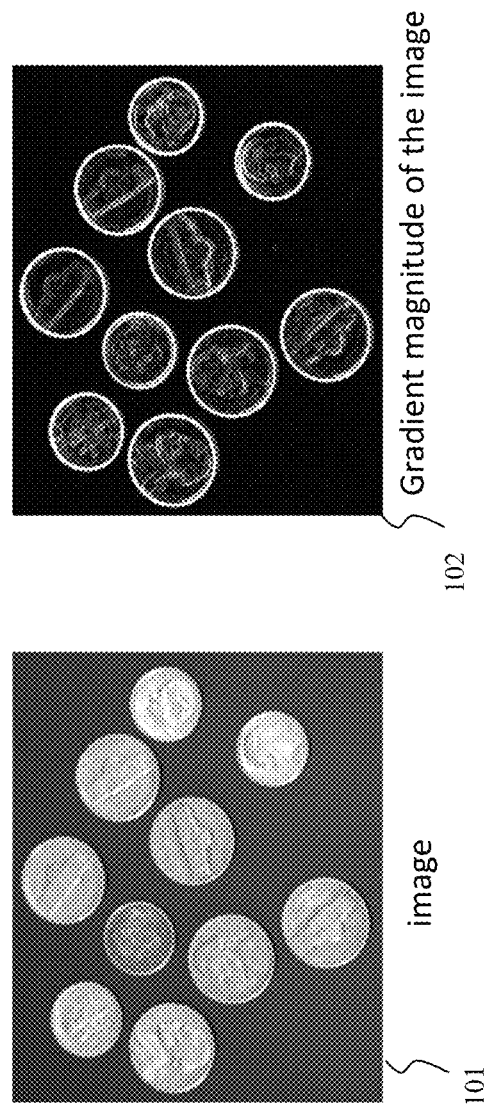
FIG. 1 shows an example of an image 101 and its gradient image 102 used by some embodiments to train an image generator.
Figure 2:
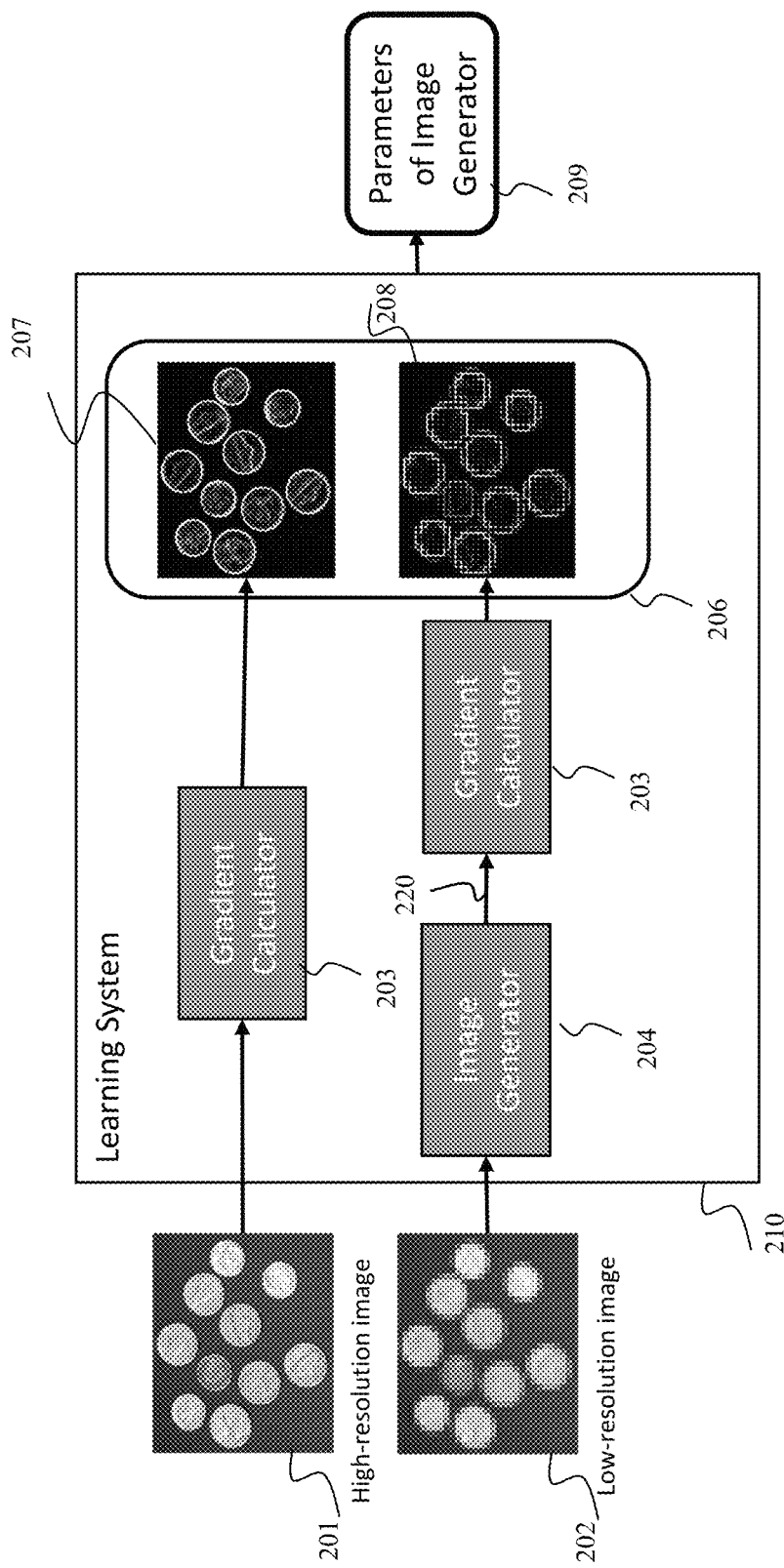
FIG. 2 shows a schematic of a method for training an image generator for upsampling low-resolution images according to some embodiments.

FIG. 1 shows an example image 101 and its gradient image 102 where each pixel indicates the magnitude of image gradient computed on that pixel of the input image according to some embodiments. As can be seen edges and high frequency details produce high gradient magnitudes. Some embodiments are based on realization that preserving the gradient magnitude during super-resolution is beneficial in recovering high-frequency information from the low-resolution image. Generating sharp images is critical for further recognition and identification tasks from low-resolution images FIG. 2 shows a schematic of a method for training an image generator for upsampling low-resolution images according to some embodiments. The image generator increases the resolution of the low-resolution images to produce the images of high or higher resolution. An example of the image generator is a neural network.

A pair of high-resolution image 201 and corresponding low-resolution image 202 is provided to the learning system 210. In this disclosure, the low- and high-resolution terms are used with respect to each other. Specifically, a resolution of a high-resolution image is greater than a resolution of a low-resolution image. The system 210 optimizes a cost function to learn parameters 209 of an image generator 204. Low-resolution image 202 is upsampled by the image generator 204 to produce an upsampled image 220. Gradient calculation 203 is performed on both high-resolution ground truth image 201 and super-resolved upsampled image 220.

For example, some embodiments compute the image gradients on a pixel-by-pixel basis, e.g., using a Gaussian kernel convolution followed by spatial gradient calculation. Let I denote an image and $H_\sigma$ denote convolution function with a Gaussian kernel of variance $\sigma$. We first convolve the image with the Gaussian kernel in order to decrease the estimation noise in gradient computation $$J = H_\sigma$$ (I)

Image gradient in x and y direction computed at a pixel location (r,c) of the convolved image is $$G_x(r,c) = J(r+1,c) - J(r-1,c)$$

$$G_y(r,c) = J(r,c+1) - J(r,c-1)$$

Where I(r,c) denotes the intensity value read at pixel (r,c) of the image I. Consequently, the magnitude of the gradient is computed as $$G(r,c) = \sqrt{G_x(r,c)^2 + G_x(r,c)^2}$$

This gradient calculation yields a pair of gradient images 206, first image 207 is the gradient of the high-resolution image 201 and the second image 208 of the pair being gradient of the super-resolved upsampled image 220. Thus, the learning system minimizes the Euclidean distance between the gradient images 207 and 208 to determine/update parameters 209 of the image generator 204. The learning system outputs parameters 209 of image generator after the optimization is complete. For example, the parameter update can be performed iteratively for one or multiple pairs of input images, and the learning system outputs the parameters 209 when a termination condition is met. Example of the termination condition includes a number of iteration and a rate of update of the parameters 209.

Some embodiments are based on recognition that the upsampling of the photorealistic high-resolution image, e.g., the image of a face, need to satisfy the following constraints. The first constraint is a global constraint that mandates that the reconstructed high-resolution face image need to satisfy holistic constraints such as shape, pose, and symmetry, and need to include detailed characteristic facial features such as eyes and nose. The second constraint is a local constraint that mandates that the statistics of the reconstructed local image regions need to match that of high-resolution face image patches, e.g., smooth regions with sharp boundaries, and should include face-specific details. The third constraint is a data constraint that mandates that the reconstruction need to be consistent with the observed low-resolution image. However, although L2 distance between pixel intensities can preserve data constraints, it can fail to satisfy global and local constraints that are critical for further recognition of the image.

Some embodiments are based on realization that high frequency information in an image comes from the regions with large image gradients. Thus, if the large gradients are preserved during upsampling process, the resulting images can be sharper. Moreover, the shape statistics of the gradient profiles in a natural image are stable and invariant to the image resolution. With such stable statistics, the statistical relationship of the sharpness of the gradient profile between the high-resolution image and the super-resolved low-resolution image can be learned. Using the gradient profile prior and the statistical relationship, a constraint is provided on the gradient field of the high-resolution image. When combined with a reconstruction constraint, high-quality high-resolution image results.

Some embodiments are based on recognition that high magnification factors greater than four times for targeted objects such as faces can benefit from the deep learning methods to provide an upsampling of the image that is as close as possible to "a face image". Because, in some applications, resulting upsampled images are meant to be used in face identification task, recovering "the face" is beneficial. Some embodiments present an image super-resolution method that preserves high frequency details that are beneficial for further classification or recognition of the images.

To that end, in order to preserve high frequency details, some embodiments use L2 distance between image gradients of ground truth images of high resolution and the corresponding images super-resolved by the neural network to train the neural network for image super-resolution. The use of image gradient constraints helps to speed up convergence as well as to produce sharper looking images.

Figure 3:
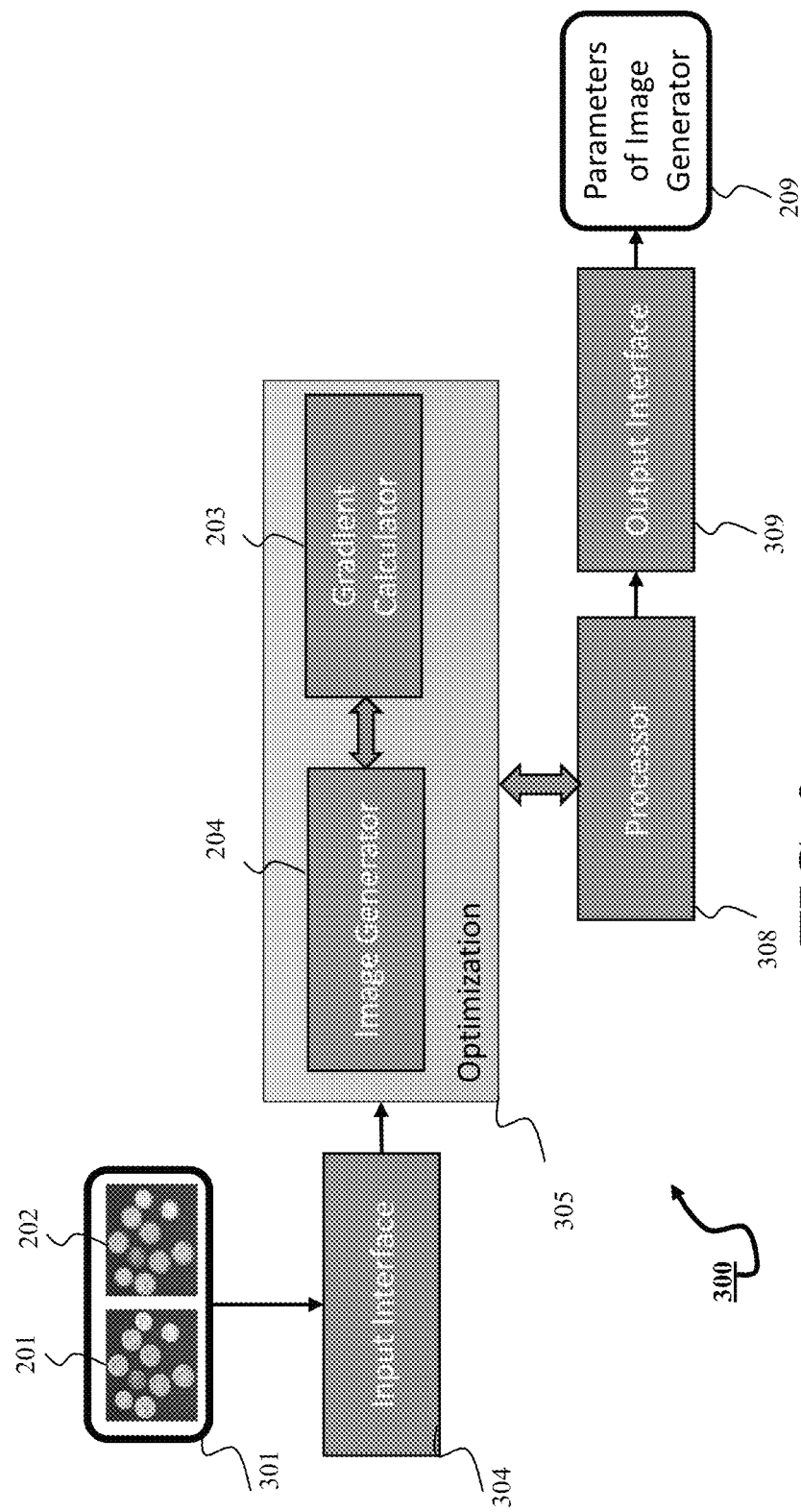
FIG. 3 shows a block diagram of an image processing system for training the image generator according to some embodiments.

FIG. 3 shows a block diagram of an image processing system 300 for training the image generator according to some embodiments. The system 300 includes an input interface 304 receives pairs of images 301 including low-resolution image 202 and its corresponding high resolution image 201. For example, the input interface can include a human machine interface that connects the system 300 to a keyboard and pointing device such as a mouse, trackball, touchpad, joy stick, pointing stick, stylus, or touchscreen, among others.

Additionally, or alternatively, the input interface 304 can include a network interface controller to connect the training system to a network. The network, such as wired and/or wireless network, can be used to download the pair of the training images 301 for father processing.

The image processing system 300 includes a processor 308 to solve an optimization problem 304 by minimizing the super-resolution loss function to find parameters 204 of the image generator, which interacts with gradient calculator 203. The processor 308 can be a single core processor, a multi-core processor, a computing cluster, or any number of other configurations.

The image processing system 300 includes an output interface 309 to render parameters of image generator 209 after the optimization problem is solved. The output interface 309 can include a memory such as random access memory (RAM), read only memory (ROM), flash memory, or any other suitable memory systems. Additionally, or alternatively, the output interface can include a display interface adapted to connect the image processing system 300 to a display device such as a computer monitor, camera, television, projector, or mobile device, among others. Additionally, or alternatively, the output interface can include an imaging interface adapted to connect the system 300 to an imaging device. In one embodiment, the training images are received from and/or render to an imaging device such as a video camera, computer, mobile device, webcam, or any combination thereof.

Additionally, or alternatively, the output interface includes an application interface adapted to connect the image processing system 300 to an application device that can operate based on results of image upsampling and super-resolution. For example, the application device can perform security applications. For example, the application device can be operatively connected to the image generator trained by the image processing system 300 and being configured to upsample an input image using the image generator and perform a control action based on the upsampled input image.

Figure 4:
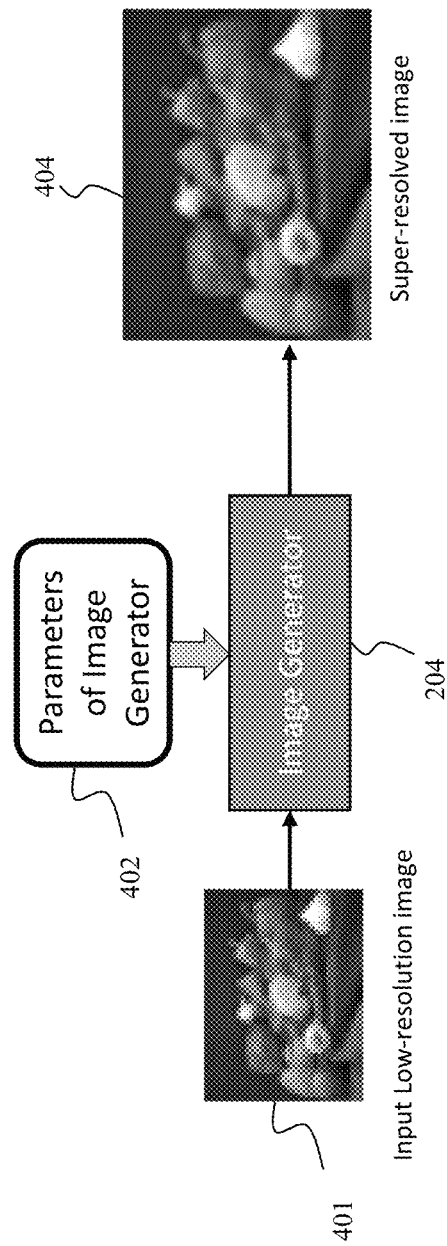
FIG. 4 presents a schematic of the upsampling after the training of the image generator is completed according to some embodiments.

FIG. 4 presents a schematic of the upsampling after the training of the images generator is completed according to some embodiments. A given input low resolution image 401 is fed to our image generator 204, whose parameters 209 are found during training process. Image generator 204 outputs the super-resolved upsampled image 404 as a result of the testing/inference. In a number of implementations, the resolution of the super-resolved upsampled image 404 corresponds to the resolution of the high-resolution images 201 used for the training.

Figure 5:
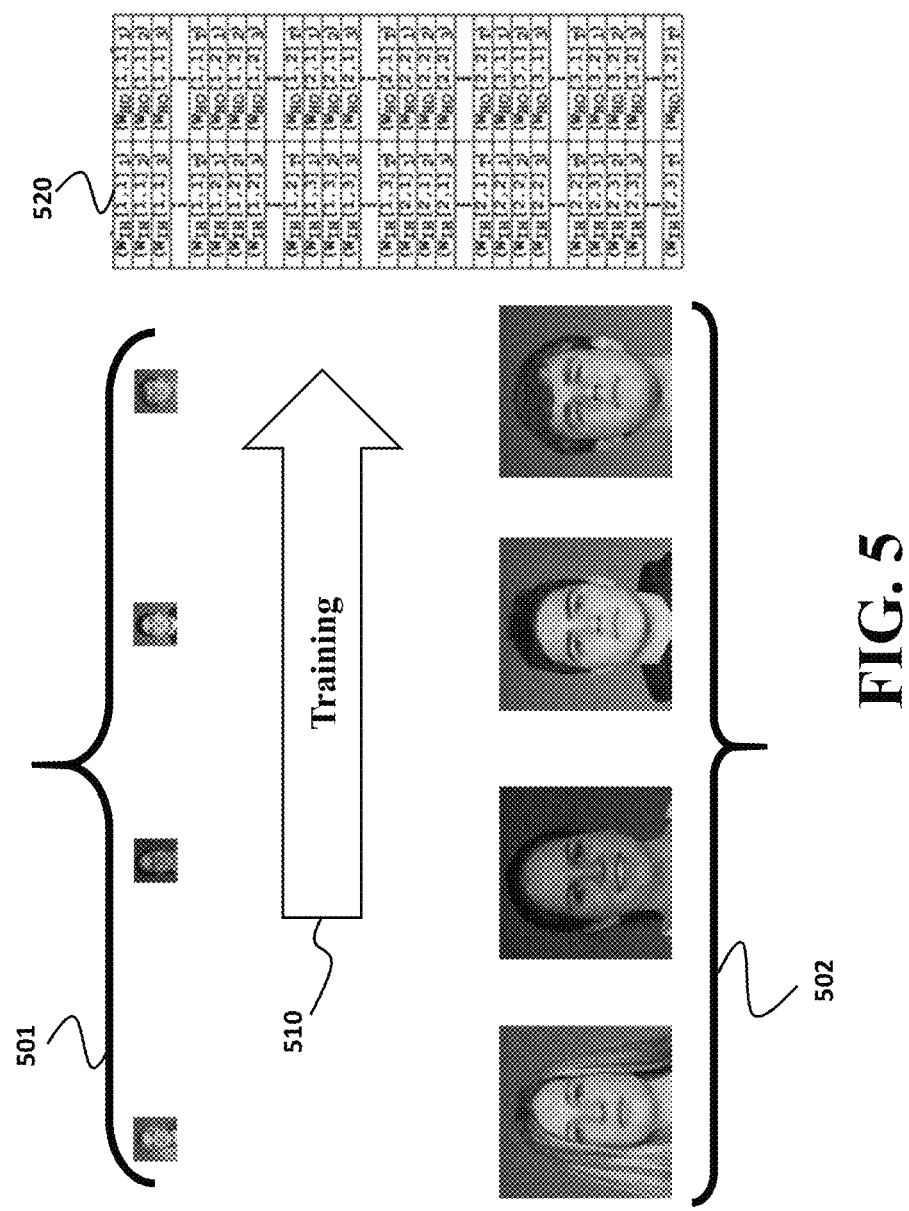
FIG. 5 shows a schematic of the training used by some embodiments.

FIG. 5 shows a schematic of the training used by some embodiments. In these embodiments, the image generator is an artificial-neural-network. The training 510 uses a training set of pairs of low-resolution images 501 and corresponding high-resolution ground-truth image 502 to produce the weights 520 of the network. In general, training an artificialneural-network includes applying a training method, sometimes referred to as a "learning", to an artificial-neural-network in view of a training set. A training set may include one or more sets of inputs and one or more sets of outputs with each set of inputs corresponding to a set of outputs. A set of outputs in a training set comprises a set of outputs that are desired for the artificial-neural-network to generate when the corresponding set of inputs is inputted to the artificial-neural-network and the artificial-neural-network is then operated in a feed-forward manner.

Training the neural network involves computing the weight values associated with the connections in the artificial-neural-network. To that end, unless herein stated otherwise, the training includes electronically computing weight values for the connections in of the layers and/or nodes of the neural network. Those weight values are parameters of the image generator.

Figure 6:
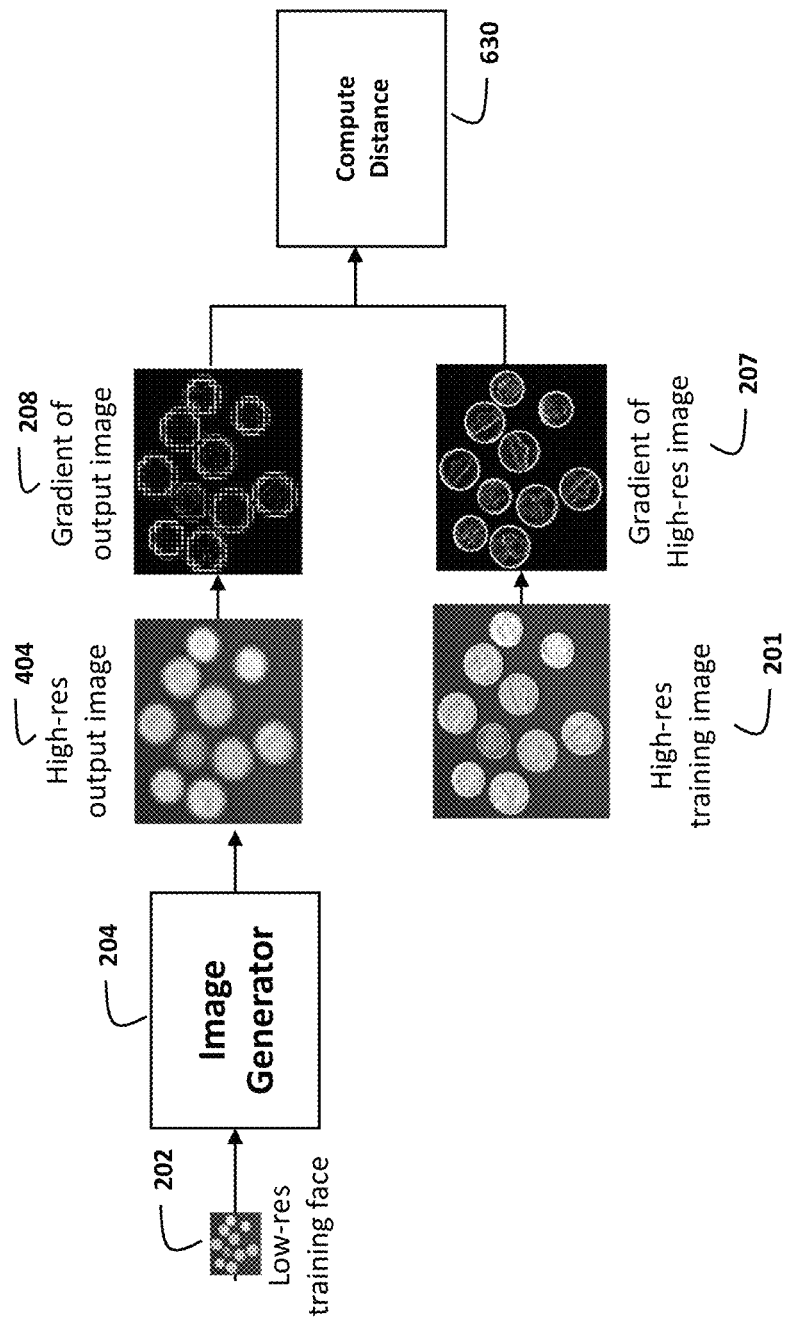
FIG. 6 shows a block diagram of the training method used by some embodiments.

FIG. 6 shows a block diagram of the training method 510 used by some embodiments. The method upsamples the low-resolution image from the set 510 using the image generator 204 to produce the upsampled image 404 and compares the upsampled image 404 with the corresponding high-resolution image from the set 201. Gradient of output image 208 and gradient of high-resolution image 207 are computed to produce a distance 630 between the two gradient images. For example, one embodiment determines Euclidean distance between two gradient images. The network is trained using an optimization procedure to minimize the distances 630 with respect to network parameters. The optimization can be done using various different methods including gradient descent, stochastic gradient descent, and Newton's method.

For example, in one embodiment, the processor solves an optimization problem to produce parameters of the image generator reducing distances between image gradients of the high-resolution images and the corresponding low-resolution images upsampled by the image generator. Let G denote the image generator, which outputs a high-resolution image given a low-resolution image and D denote the function for gradient magnitude computation. During training, we are provided with N pairs of high-resolution and corresponding low-resolution images $I_{HR}^i$, $I_{LR}^i$ respectively. The loss function based on the distance between gradient magnitudes is:

$$\mathcal{L}_{grad} = \sum_{i=1}^{N} \|D(I_{HR}^i) - D(G(I_{LR}^i))\|$$

where $\|.\|$ denotes the $L_2$ norm.

Additionally, or alternatively, in one embodiment, the processor minimizes a cost function including a weighted combination of the distances between the image gradients and distances between pixel intensities of the high-resolution images and the corresponding low-resolution images upsampled by the image generator. This embodiment balances advantages of the gradient and pixel intensities to improve the quality of the upsampled images. The loss function based on pixel intensities can be expressed as $$\mathcal{L}_{int} = \sum_{i=1}^{N} \|I_{HR}^i - G(I_{LR}^i)\|$$

A weighted combination of the two functions can be used as a loss in training the system $$\mathcal{L} = \alpha \mathcal{L}_{int} + \beta \mathcal{L}_{grad}$$

where α and β are the weighting factor between two losses. The weighting factors can be empirically determined based on the problem in hand. If α is much more smaller than β and/or close to 0 then the image generator will yield smother images. Similarly, when β is smaller compared to α and/or close to 0, then the image generator will produce sharper looking images.

Notice that the gradient image of the high-resolution output image looks more smoothed out compared to the gradient image of the ground truth image. This is because the super-resolved image is blurry and it lacks details information around the edges. Once again, the gradient image gives vital information on which pixels of the image has high-frequency details and how they can be sharpened.

Figure 7:
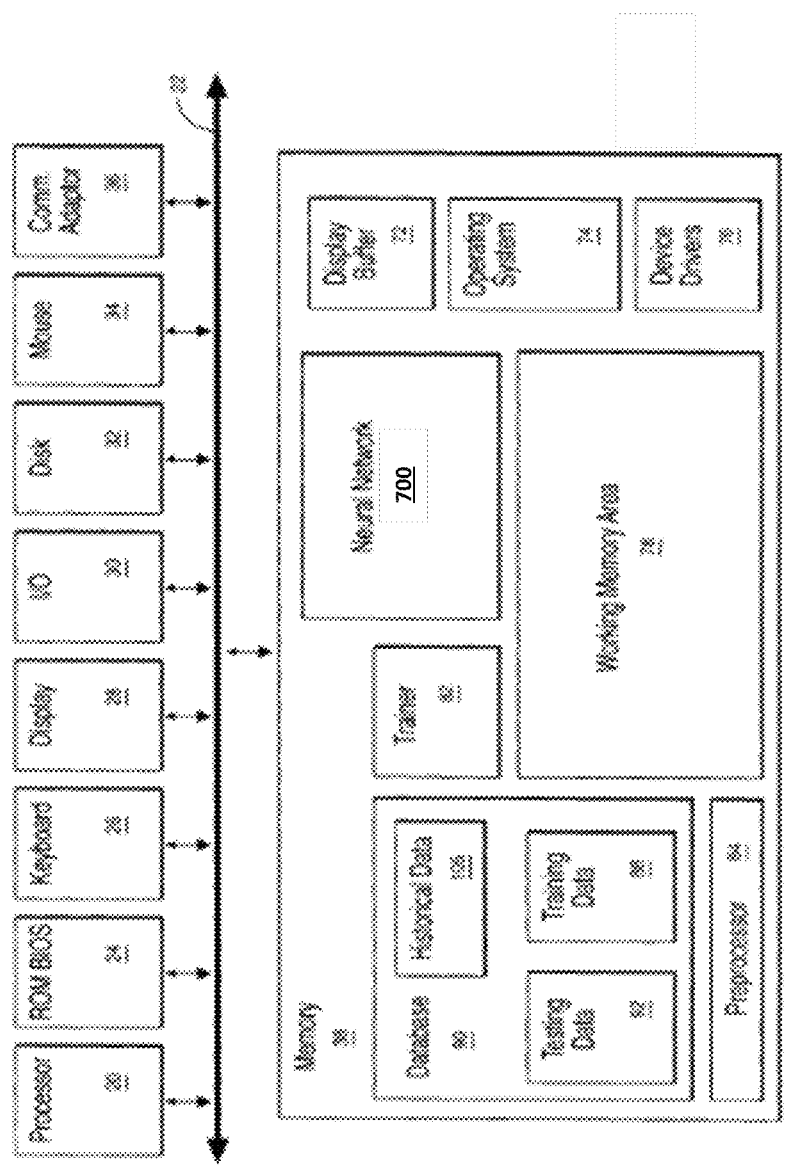
FIG. 7 shows a block diagram of a training system according to one embodiment.

FIG. 7 shows a hardware diagram of a training system used the image processing system according to one embodiment. The training system includes a processor connected by a bus 22 to a read only memory (ROM) 24 and a memory 38. The training system can also include are a display 28 to present information to the user, and a plurality of input devices including a keyboard 26, mouse 34 and other devices that may be attached via input/output port 30. Other input devices such as other pointing devices or voice sensors or image sensors can also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a database 90, trainer 82, the image generator including a neural network 700, preprocessor 84. The database 90 can include the historical data 105, training data, testing data 92. The database may also include results from operational, training or retaining modes of using the neural network. These elements have been described in detail above.

Also shown in memory 38 is the operating system 74. Examples of operating systems include AIX, OS/2, and DOS. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 700, trainer 82, the operating system 74 and other functions. The working memory area 78 may be partitioned amongst the elements and within an element. The working memory area 78 may be utilized for communication, buffering, temporary storage, or storage of data while a program is running.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way.

Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. An image processing system, comprising:
   an input interface to receive a set of pairs of images to train an image generator, each pair includes a low-resolution image of a scene and a high-resolution image of the scene;
   a processor to train the image generator by solving an optimization problem to produce parameters of the image generator reducing distances between image gradients of the high-resolution images and the corresponding low-resolution images upsampled by the image generator; and
   an output interface to render the parameters of the image generator.

2. The image processing system of claim 1, wherein the image generator is a neural network, wherein the parameters of the image generator are weights of connections between nodes of different layers of the neural network, such that the processor trains the neural network using the set of pairs of images.

3. The image processing system of claim 1, wherein the processor minimizes a cost function including a weighted combination of the distances between the image gradients and distances between pixel intensities of the high-resolution images and the corresponding low-resolution images upsampled by the image generator.

4. The image processing system of claim 1, wherein the processor solves the optimization problem using a stochastic gradient descent.

5. The image processing system of claim 1, wherein the processor is configured to compute the image gradients using a Gaussian kernel convolution followed by spatial gradient calculation.

6. The image processing system of claim 1, wherein the processor determines the image gradients on a pixel-by-pixel basis.

7. A device operatively connected to the image generator trained by the image processing system of claim 1, wherein the device is configured to upsample an input image using the image generator and perform a control action based on the upsampled input image.

8. An image processing method, wherein the method uses a processor coupled with stored instructions implementing the method, wherein the instructions, when executed by the processor carry out steps of the method, comprising:
   receiving a set of pairs of images to train an image generator, each pair includes a low-resolution image of a scene and a high-resolution image of the scene;
   training the image generator by solving an optimization problem to produce parameters of the image generator reducing distances between image gradients of the high-resolution images and the corresponding low-resolution images upsampled by the image generator; and
   outputting the parameters of the image generator.

9. The image processing method of claim 8, wherein the image generator is a neural network.

10. The image processing method of claim 8, wherein the solving comprises:
    minimizing a cost function including a weighted combination of the distances between the image gradients and distances between pixel intensities of the high-resolution images and the corresponding low-resolution images upsampled by the image generator.

11. The image processing method of claim 8, wherein the optimization problem is solved using a stochastic gradient descent.

12. The image processing method of claim 8, further comprising:
    computing the image gradients using a Gaussian kernel convolution followed by spatial gradient calculation.

13. The image processing method of claim 8, wherein the image gradients are computed on a pixel-by-pixel basis.

14. A non-transitory computer readable storage medium embodied thereon a program executable by a processor for performing a method, the method comprising:
    receiving a set of pairs of images to train an image generator, each pair includes a low-resolution image of a scene and a high-resolution image of the scene;
    training the image generator by solving an optimization problem to produce parameters of the image generator reducing distances between image gradients of the high-resolution images and the corresponding low-resolution images upsampled by the image generator; and
    outputting the parameters of the image generator.

15. The medium of claim 14, wherein the solving comprises:
    minimizing a cost function including a weighted combination of the distances between the image gradients and distances between pixel intensities of the high-resolution images and the corresponding low-resolution images upsampled by the image generator.

* * * * *